United States Patent [19]

Gaiser

[11] Patent Number: 4,781,092
[45] Date of Patent: Nov. 1, 1988

[54] APPARATUS FOR FEEDING BAR-LIKE WORKPIECE MATERIAL IN A SEVERING MACHINE

[75] Inventor: Ruprecht Gaiser, Baden-Baden, Fed. Rep. of Germany

[73] Assignee: Keuro Maschinenbau GmbH & Co., Achern-Gamshurst, Fed. Rep. of Germany

[21] Appl. No.: 104,193

[22] Filed: Oct. 5, 1987

[30] Foreign Application Priority Data

Oct. 3, 1986 [DE] Fed. Rep. of Germany ....... 3633691

[51] Int. Cl.[4] .............................................. B26D 7/06
[52] U.S. Cl. ........................................ 83/153; 83/206; 83/277; 83/282
[58] Field of Search ................. 83/151, 153, 206, 277, 83/437, 276, 209, 282, 251

[56] References Cited

U.S. PATENT DOCUMENTS

3,707,103  12/1972  Tishken ................................. 83/113
4,252,040   2/1981  Kiefer .................................... 83/42
4,321,848   3/1982  Millar et al. .......................... 83/153
4,342,240   8/1982  Gaiser et al. ........................... 83/42

Primary Examiner—E. R. Kazenske
Assistant Examiner—Eugenia A. Jones
Attorney, Agent, or Firm—Edwin E. Greigg

[57] ABSTRACT

An apparatus for feeding bar-like workpiece material in a severing machine is disclosed, which has an openable and closable pair of chuck jaws disposed nondisplaceably in the feed direction of the material before the cutting plane and an openable and closable pair of feed jaws disposed behind the cutting plane and displaceable in the material feed direction. In crossing the cutting plane, this pair of feed jaws can grasp the unworked material anew and, with the chuck jaws open, advance it. A pair of removal jaws is provided, disposed behind the cutting plane and displaceable in the material feed direction, with which the material to be severed can be grasped before the end of the severing cut and removed in the material feed direction after the end of the severing cut. It is also provided that the feed jaws are movable out of the displacement path of the removal jaws that extends in the material feed direction.

6 Claims, 6 Drawing Sheets

APPARATUS FOR FEEDING BAR-LIKE WORKPIECE MATERIAL IN A SEVERING MACHINE

BACKGROUND OF THE INVENTION

The invention relates to an apparatus for feeding bar-like workpiece material in a severing machine, in the form of a coping saw, circular cold saw, bandsaw or the like. The apparatus has an openable and closable pair of chuck jaws disposed nondisplaceably in the feed direction of the material before the cutting plane for holding the material resting on a table of the severing machine and on a supply apparatus optionally preceding the table during the cutting. The apparatus also has an openable and closable pair of feed jaws disposed behind the cutting plane and displaceable in the material feed direction. With this pair of feed jaws, crossing the cutting plane, the unworked material can be grasped anew and fed, with the chuck jaws open.

An apparatus of this type is disclosed in German Patent No. 28 16 297. In it, shortly before the completion of the severing cut, the feed jaws already grasp the piece of material that is to be severed, and once the severing cut has been made they remove this severed piece in the direction of material feed and then return, crossing the cutting plane, so as to grasp the end of the material protruding beside the stationary chuck jaws and effect the feeding of material, with the chuck jaws now open.

As a result of this sequence of operation, the material feed and the next severing cut must wait until the previously severed piece of material has been removed by the feed jaws and the feed jaws have returned to the vicinity of the cutting plane. This results in slower operation of the machine, or in other words a shorter primary working time, i.e., less time in which severing work is done, for the severing machine.

OBJECT AND SUMMARY OF THE INVENTION

It is accordingly the object of the invention to improve an apparatus of the aforementioned generic type such that after one severing operation, the new feeding of material and the next severing operation can begin immediately before the severed piece of material has been disposed of, and that after the ensuing removal of the previously severed piece of material the next piece of material to be severed can be grasped, before its severing has been completed. In other words, the object is not to restrict the primary working time of the severing machine, while at the same time fully retaining the function of the known apparatus.

In an apparatus as defined generically above, this object is attained in accordance with the invention in that an openable and closable pair of workpiece removal jaws, disposed behind the cutting plane and displaceable in the material feed direction, is provided, by means of which the material to be severed can be grasped before the severing cut is completed and can be removed in the material feed direction after the severing cut is completed, and further in that the feed jaws are movable out of the displacement path, which extends in the material feed direction, of the workpiece removal jaws.

These provisions according to the invention have the effect that the work of feeding the material, on the one hand, and of holding the piece of material to be severed before the completion of the severing cut as well as removing it, on the other, is divided between two pairs of jaws. In this way, after the end of the severing cut, the material feeding can first be performed directly, with the aid of the feed jaws; to this end, depending on the situation in an individual case, the workpiece removal jaws holding the severed piece of material may be spatially offset somewhat, in order to make room for the feed jaws. Then the severed piece of material can be removed with the aid of the workpiece removal jaws, whereupon the removal jaws can then return to the new workpiece being worked on and can grasp it, so that it is securely held when the severing cut ends. In this way, none of the severing work time of the severing machine is lost to the removal of a severed piece of material; instead, the same time period required for performing the severing cut to form one workpiece can be used to remove the previously severed workpiece, thus being doubly utilized.

For embodying the apparatus according to the invention, it is suitable for the feed jaws to be pivotably supported on the removal jaws in such a way that when the feed jaws are pivoted outwardly, the removal jaws are movable up to the cutting plane of the severing machine, so that they can securely grasp even short pieces of material to be severed. Once the piece of material has been severed, the feed jaws can be pivoted inwardly into the region between the chuck jaws and the removal jaws, and can grasp the following material next to the chuck jaws to feed it anew.

It should be understood in this respect that the dimensioning of the feed jaws will correspond to the aforementioned spacing distance between the chuck jaws and the disposal jaws. Should this distance be too short, because of structural considerations, then recourse can be had to the possibility referred to above, wherein the removal jaws having the severed piece of material can be initially spaced slightly apart from the following material and the chuck jaws.

A similar realization of the concept of the invention is obtained by disposing the feed jaws on the removal jaws to allow displacement thereof transversely to the material feed direction, such that with the feed jaws moved out of the way, the removal jaws can be moved as far as the cutting plane of the severing machine. The aforementioned pivotability of the feed jaws on the removal jaws is replaced here by a displaceability of the feed jaws, the direction of which may be transverse to the axis of the material feed or at a tangent to it. Once again, the above-discussed factors of the spacing between the chuck jaws and the removal jaws apply accordingly.

In another possible embodiment, the feed jaws are displaceable on the severing machine frame not only in the material feed direction but also transversely to the direction of material feeding, and thus with the feed jaws moved out of the way the removal jaws are movable as far as the cutting plane of the severing machine. Accordingly, the feed jaws and the removal jaws this time are not combined into one structural unit, but instead can function independently of one another, so that the removal jaws having the severed piece of material can already move away before the cutting plane, while the feed jaws are still occupied with feeding the material.

In the last embodiment mentioned above, the transverse displaceability of the feed jaws may be provided in the direction of their openability and closability;

however, it appears more suitable for the transverse displaceability of the feed jaws to be provided transverse to the direction of their opening and closing mobility so as to make more room for the removal jaws.

It will be understood that the sequences of motion described hereinabove can be executed fully automatically, or optionally under automatic control, by the components involved; for the opening and closing movements of the various jaws, actuation by cylinder-piston units is suitable, while the movements taking place parallel to the axis of the material are advantageously effected by means of spindle drives.

The invention will be better understood and further objects and advantages thereof will become more apparent from the ensuing detailed description of preferred embodiments, taken in conjunction with the drawings.

DESCRIPTION OF THE PREFERRED EMBODIMENTS

Figure 1:
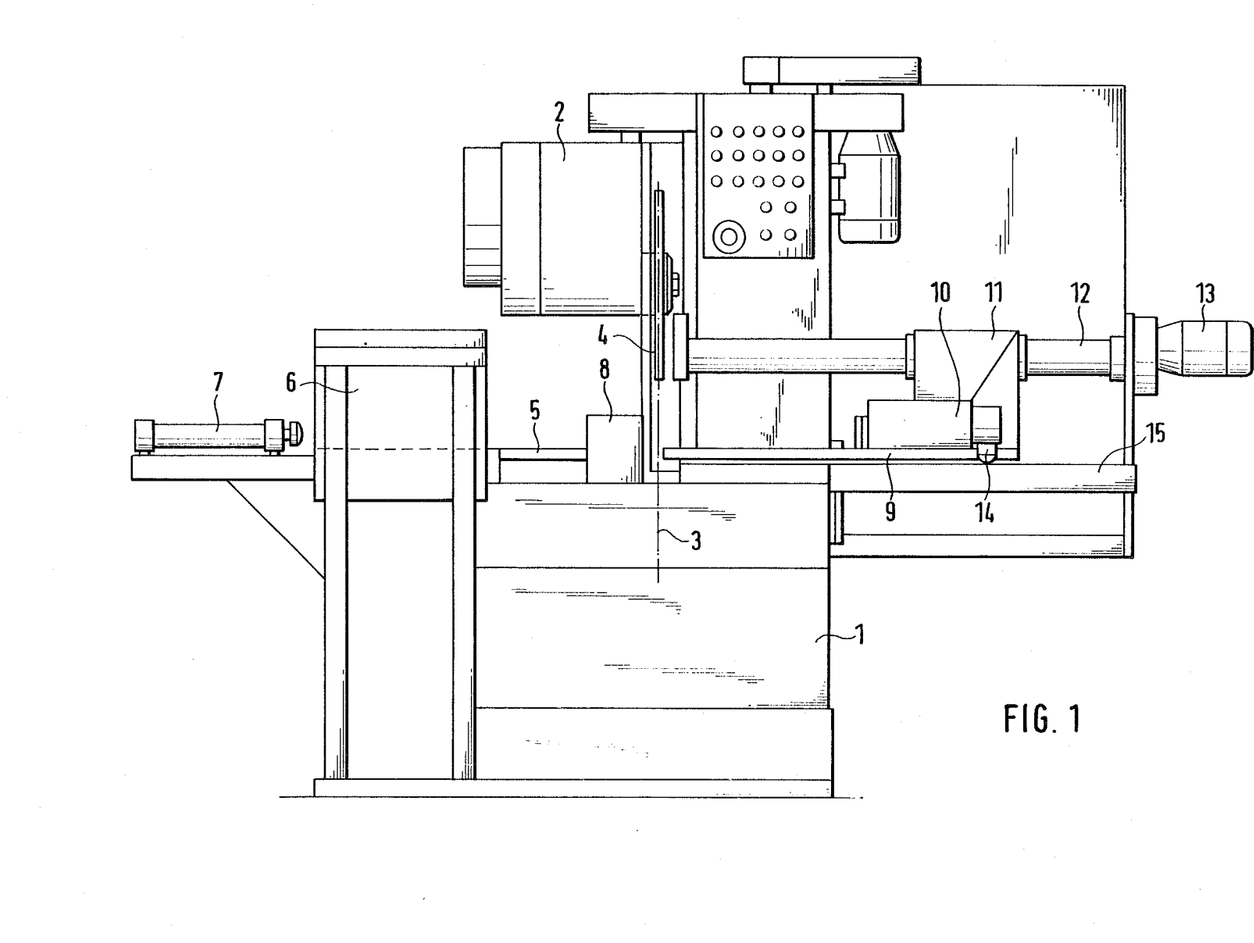
FIG. 1 side view of a circular cold saw having a feed apparatus for bar-like material.

FIG. 1 is a view of a circular cold saw having a machine frame 1, on which a tool carriage 2 is movable vertically, carrying the saw blade 4 that revolves along the cutting plane 3.

The bar-like material, not shown, that is to be severed by the saw blade 4 moves from left to right over the machine table 5 toward the cutting plane 3; in the present case, the bar-like material is taken from a magazine 6 and deposited on the machine table 5, on which it is moved individually into position by a loading cylinder 7.

In the feed direction of the material before the cutting plane 3, the bar-like material is held by a pair of chuck jaws 8, which are openable and closable transversely to the feed direction, and vertically with respect to the observer in terms of FIG. 1. In the feed direction of the material behind the cutting plane 3, the feeding and disposal of the bar-like material take place on a continuation 9 of the machine table 5, by means of feed jaws, generally identified as 10, and removal jaws, generally identified as 11, which here are movable in common along on a guide 12 in the direction of material feeding with the aid of a spindle drive, not shown in detail, which is supplied by a motor 13. The unit 10/11 is supported to prevent pivoting via a support roller 14 on a track 15 provided on the machine frame 1 and is movable in the direction of material feeding.

Figure 2:
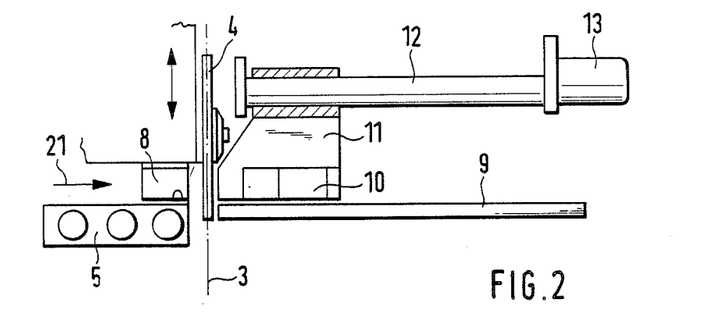
FIGS. 2 and 3 are fragmentary, simplified views, seen from the side and from below, respectively, of the feed apparatus of FIG. 1 upon completion of the severing operation.
Figure 3:
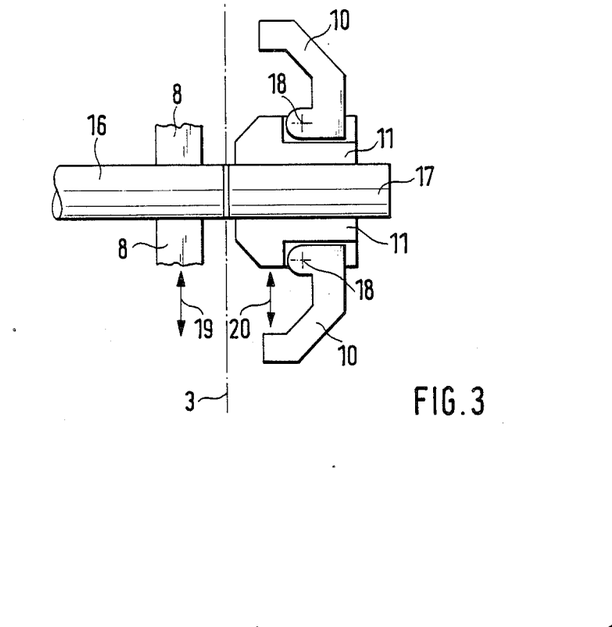
Figure 4:
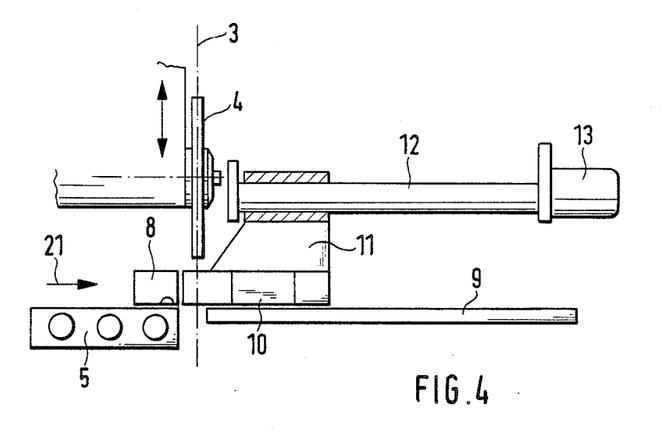
FIGS. 4 and 5 are fragmentary, simplified views, from the side and from below, of the feed apparatus of FIG. 1 at the beginning of material feeding.
Figure 5:
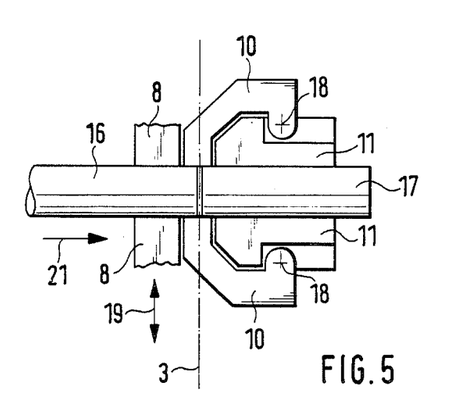
Figure 6:
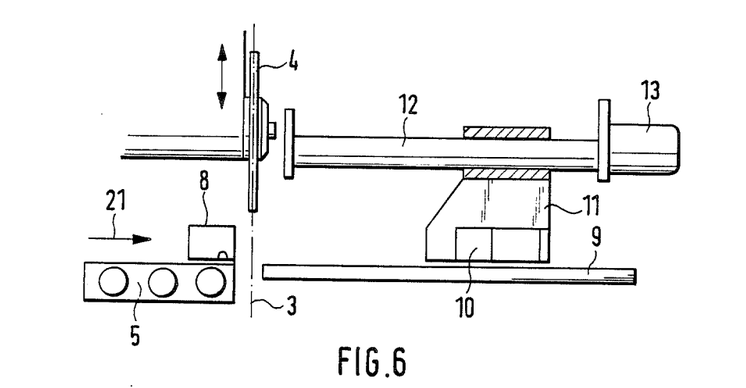
FIGS. 6 and 7 are fragmentary, simplified views, from the side and from below, of the feed apparatus of FIG. 1 during the severing cut while a piece of material that has been severed is removed.
Figure 7:
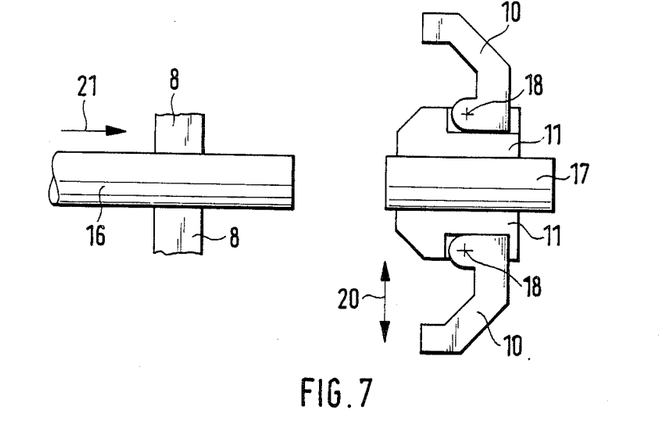

The disposition and operation of the various pairs of jaws mentioned will now be explained in further detail, referring to FIGS. 2-7. FIGS. 2, 4 and 6 show a detail of FIG. 1 in various positions of the feed jaws and the removal jaws, while FIGS. 3, 5 and 7 show the position of the respective jaws in a view looking upward from the plane on which the bar-like material rests. In FIGS. 2-7, the same reference numerals are used as in FIG. 1, if the same elements are involved.

According to FIGS. 2 and 3, the various pairs of jaws 8, 10 and 11 along with the saw blade 4 are shown at the moment when a piece of material 17 is severed from bar-like material 16. At this moment, the bar-like material 16 is still held by the chuck jaws 8, and the severed piece of material 17 behind the cutting plane is also still held by the removal jaws 11, so that upon termination of the severing cut this piece 17 still has a defined position, from which it cannot deviate.

Feed jaws 10 are pivotably supported on the removal jaws 11 about vertical axes 18. In the status shown in FIGS. 2 and 3, the feed jaws are in a position pivoted away from the cutting plane 3, so that the removal jaws 11 can be moved unhindered to the cutting plane 3. This feature is important for grasping workpiece sections that are shorter than the piece of material 17 shown in FIG. 3.

Also, referring to FIGS. 2 and 3 but in a manner also applicable to FIGS. 4-7, the lower one of the pair of chuck jaws 8, as seen in FIG. 3, may be automatically displaceable in the direction of the arrow 19, in order to provide for opening and closing of this pair of chuck jaws. Similarly, the lower one of the pair of removal jaws 11, as seen in FIG. 3, may be automatically adjustable in the direction of the arrow 20 so as to grasp or release the piece of material 17.

Once a piece of material 17 has been severed, as shown in FIGS. 2 and 3, then as shown in FIGS. 3 and 4 the feed jaws 10 are pivoted about an angle of 90° by actuating means not shown, into the spacing zone between the chuck jaws 8 and the removal jaws 11, in order to be able to grasp the end of the bar-like material 16 there. If the lower chuck jaw 8, as seen in FIG. 5, is now displaced downward in the direction of the arrow 19, or in other words if the chuck jaws 8 are opened, then by movement of the removal jaws 11 along the guide 12, the bar-like material 16 can be fed in the direction of the arrow 21 by the length of the next piece of material to be severed, whereupon the saw blade 4 can begin the next severing cut, during which operation the chuck jaws 8 are of course closed again.

During this severing cut, the removal jaws 11 now have time to remove the previously severed piece of material 17 in the manner shown in FIGS. 6 and 7 and deposit it at a position remote from the cutting plane 3 by opening the lower one, as seen in FIG. 7, of the removal jaws 11 in the direction of the arrow 20. After that, the removal jaws 11 return, in the opened state, to the cutting plane 3 and, with the feed jaws 10 located in the open position shown in FIG. 7, grasp the next piece of material 17, which is still being worked on, so that it is securely held even before the completion of its severing cut. After that the process described above begins over again.

The apparatus shown in FIGS. 2-7 is embodied such that the feed jaws 10 move into the spacing distance between the chuck jaws 8 and the removal jaws 11, in the position shown in FIGS. 2-5. In the event that under the conditions of a particular case this distance should be insufficient to allow the passage of the feed jaws 10 in between the jaws 8 and the jaws 11, it may be provided that after the completion of a severing cut the removal jaws 11 first set the severed piece of material 17 down a short distance away from the cutting plane 3 in the feed direction 21 of the material, in order to make room for the insertion of the feed jaws 10, and optionally also to provide the possibility that the feed jaws 10 do not simultaneously grasp both the bar-like material 16 that has not yet been worked and the severed material 17, as shown in FIGS. 4 and 5, but instead grasp only the end of the bar-like material 16 that has not yet been worked.

The structure and operation of the apparatus shown in simplified form in FIGS. 2-7 is seen to have the effect that once a severing cut has been performed, the feeding of the bar-like material 16 can take place first, so as to furnish the piece of material to be severed next, before the already severed piece of material 17 is removed by the removal jaws 11 in the manner shown in FIGS. 6 and 7. In this way, none of the primary working time associated with the cutting tool 4 is lost to the need for removing severed pieces of material 17. Instead, these two operations are done at the same time, yet on the other hand without leaving the next piece of material in succession unguided at the end of the cutting operation, because by then the removal jaws 11, after being freed of the previously severed piece of material 17, have returned to the cutting plane 3 and grasped the next piece of material in succession.

In the embodiment shown in FIGS. 2-7, the feed jaws 10 have been combined with the removal jaws 11 into a single structural unit, the feed jaws 10 being pivotably supported in the removal jaws and movable along with the disposal movement of the removal jaws 11 in the manner shown in FIGS. 6 and 7. This does no harm, however, because the feed jaws 10 are not needed during the disposal movement. On the other hand, the structural unification of the feed jaws 10 and the removal jaws 11 is advantageous from an engineering standpoint.

In another structural embodiment, however, it may also be provided that the feed jaws be displaceable in a translational manner on the removal jaws. This kind of embodiment is shown in simplified form in the view from below provided by FIGS. 8 and 9, in which elements used in FIGS. 1-7 and also appearing here are identified by the same reference numerals as before.

Figure 8:
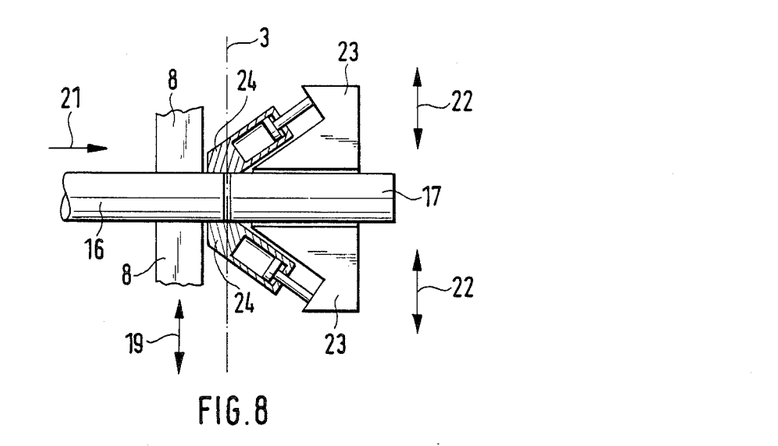
FIG. 8 and 9 are simplified views from below of a further embodiment of the feed apparatus, seen after the severing cut and after the material feeding, respectively.

As FIG. 8 shows, removal jaws 23 are provided here that are displaceable in the material feed direction 21 and are openable and closable transversely to it in the direction of the arrows 22. On these removal jaws, feed jaws 24 are supported such that they are displaceable—in the present instance, hydraulically with the aid of cylinder-piston units—obliquely to the longitudinal extension of the material to be worked, or in other words such that they can be opened and closed again crosswise to the material feed direction 21 in every case.

Figure 9:
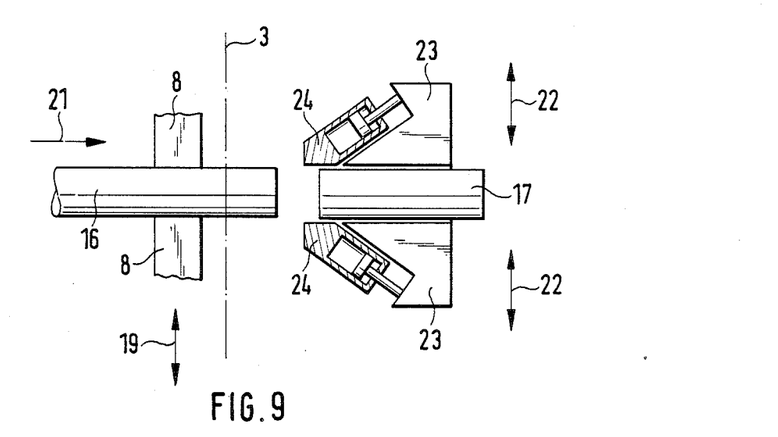

To this end, FIG. 8 shows the closing position, corresponding to FIG. 5, after the completion of a cut severing the material and prior to the effecting of the material feed, while FIG. 9 shows the status comparable to FIG. 7, in which the material for the next severing cut has already been moved outward beyond the cutting plane 3 by the feed jaws 24 and the disposal of the piece 17 by the removal jaws 23 is now taking place.

Finally, FIGS. 10 and 11, again a simplified side view and a view from below, respectively, show a possible embodiment in which the feed jaws can be actuated separately from the removal jaws. Once again, the same reference numerals as before are used, wherever the embodiment is equivalent to the earlier embodiments.

Figure 10:
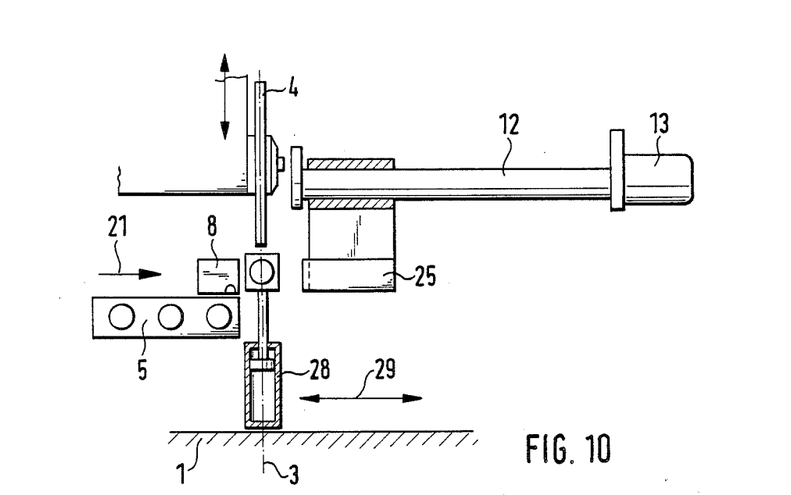
FIGS. 10 and 11 are simplified views from the side and from below of a third embodiment of the feed apparatus.
Figure 11:
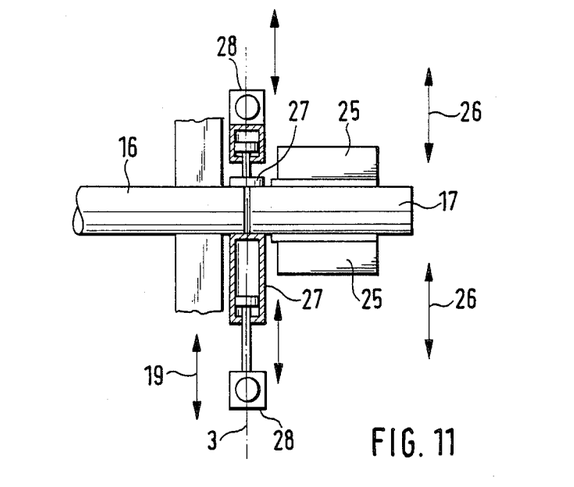

In terms of the sequence of operation, FIGS. 10 and 11 correspond to FIGS. 4 and 5. Here, however, the removal jaws 25 are displaceable automatically in the material feed direction and transversely to it, as indicated by the arrows 26, in order to remove severed pieces of material 17. By comparison, the feed jaws 27 are openable and closable, for instance in the manner shown by means of cylinder-piston units, crosswise to the material feed direction 21, while on the other side, by means of further piston-cylinder units 28, they are movable vertically, and hence likewise transversely to the material feed direction 21, out of the vicinity of the material 16. The cylinder-piston units 28, finally, in a manner not shown, are displaceable on the machine frame 1 in the feed direction 21 of the material as indicated by the arrow 29 in FIG. 10 by suitable drive means.

Thus the operation of the feed jaws, on the one hand, and that of the removal jaws, on the other, are independent of one another.

The foregoing relates to preferred exemplary embodiments of thee invention, it being understood that other variants and embodiments thereof are possible within the spirit and scope of the invention, the latter being defined by the appended claims.

What is claimed and desired to be secured by Letters Patent of the United States is:

1. An apparatus for feeding bar-like workpiece material in a severing machine, comprising a frame, said frame provided with a tool carriage mounted for vertical movement thereon, said tool carriage having a cutting means disposed thereon operable in a cutting plane, said frame further provided with a machine table for receipt of said bar-like workpieces from a magazine, means for loading said bar-like pieces and transmitting them in a material feed direction across said machine table, a pair of openable and closble chuck jaws disposed non-displaceably ahead of said cutting plane for holding said bar-like workpiece material on said machine table, a pair of openable and closable feed jaws disposed downstream of said cutting plane, said feed jaws adapted to grasp each piece of unworked workpiece material from a position astride said cutting plane and to advance same with said chuck jaws opened, a pair of openable and closable removal jaws disposed downstream of said cutting plane for displacement in said feed direction, said removal jaws adapted to grasp each said workpiece before completion of a severing operation and to remove said workpiece in said feed direction upon completion of said severing operation, said feed jaws adapted to be movable out of a displacement path of said removal jaws, said displacement path extending in the material feed direction.

2. An apparatus as defined by claim 1, in which the feed jaws are pivotably supported on the removal jaws, whereby when the feed jaws are pivoted outwardly, the removal jaws are movable as far as the cutting plane of the severing machine.

3. An apparatus as defined by claim 1, in which the feed jaws are disposed on the removal jaws for displacement transversely to the material feed direction whereby when the feed jaws are moved outwardly, the removal jaws are movable as far as the cutting plane of the severing machine.

4. An apparatus as defined by claim 1, in which the feed jaws are displaceable in the material feed direction and further displaceable on the frame of the severing machine transversely to the material feed, whereby when the feed jaws are moved outwardly, the removal jaws are movable as far as the cutting plane of the severing machine.

5. An apparatus as defined by claim 4, in which said transverse displaceability of the feed jaws is provided in the direction in which said feed jaws open and close.

6. An apparatus as defined by claim 4, in which said transverse displaceability of the feed jaws is provided transversely to the direction in which said feed jaws open and close.

* * * * *

UNITED STATES PATENT AND TRADEMARK OFFICE
CERTIFICATE OF CORRECTION

PATENT NO. : 4,781,092
DATED : November 1, 1988
INVENTOR(S) : RUPRECHT GAISER

It is certified that error appears in the above—identified patent and that said Letters Patent is hereby corrected as shown below:

The correct name of the Assignee is:

KEURO MASCHINENBAU GmbH & CO., <u>KG</u>

Signed and Sealed this

Twenty-third Day of May, 1989

*Attest:*

DONALD J. QUIGG

*Attesting Officer*  *Commissioner of Patents and Trademarks*